| [72] | Inventors | Benton R. Leach; |
| | | Allan G. Murray, both of Naugatuck, Conn. |
| [21] | Appl. No. | 523,286 |
| [22] | Filed | Jan. 27, 1966 |
| [45] | Patented | Nov. 30, 1971 |
| [73] | Assignee | United States Rubber Company |
| | | New York, N.Y. |

[54] GRAFT COPOLYMER PRODUCTS AND METHOD OF MAKING SAME
7 Claims, No Drawings

| [52] | U.S. Cl. | 260/876, 260/880 |
| [51] | Int. Cl. | C08f 19/08 |
| [50] | Field of Search | 260/876, 880 |

[56] References Cited
UNITED STATES PATENTS

| 2,820,773 | 1/1958 | Childers et al. | 260/880 |
| 3,073,798 | 1/1963 | Baer | 260/880 X |
| 3,238,275 | 3/1966 | Calvert | 260/880 |
| 3,354,108 | 11/1967 | Paradis et al. | 260/880 |

FOREIGN PATENTS

| 1,358,415 | 3/1964 | France | 260/880 |
| 1,013,393 | 12/1965 | Great Britain | 260/880 |

Primary Examiner—Murray Tillman
Assistant Examiner—M. J. Tully
Attorney—Robert J. Patterson ABSTRACT: A graft copolymer is prepared by polymerizing monomeric styrene and acrylonitrile in a latex of a synthetic rubbery copolymer of about 90 parts of butadiene and 10 parts of styrene having at least 80 percent gel content. The average particle diameter of the latex is 2,000 to 5,000 angstrom units. From 40 to 55 parts of the monomers are used with correspondingly from 60 to 45 parts of the synthetic rubber. The polymerization is carried at 120°–175° F. to a conversion of at least 85 percent of the styrene and acrylonitrile to copolymer. The anionic surface-active emulsifier level during the grafting is maintained at not over 5 parts per 100 parts of rubber and styrene-acrylonitrile copolymer that has been polymerized in the latex until at least 75 percent of the styrene and acrylonitrile monomer mixture to be polymerized in admixture with the synthetic rubber has been converted to polymer.

Preferably the rubber latex is prepared by at 100°–170° F. in the presence of 0.1–0.3 part of alkalimetal soap per 100 parts of butadiene and sytrene until 20–50 percent conversion, 1.5–2.3 parts of such soap being added during further conversion.

The resulting graft copolymer can be blended, preferably by latex blending, with a separately prepared copolymer resin of 60–80 parts of styrene and/or alpha-methyl styrene and correspondingly 40–20 parts of acrylonitrile.

Articles formed from the disclosed graft copolymer compositions are characterized by high surface gloss.

GRAFT COPOLYMER PRODUCTS AND METHOD OF MAKING SAME

This invention relates to graft copolymers of butadiene, styrene and acrylonitrile, and to mixtures of such graft copolymers with certain separately prepared copolymer resins.

The products of the present invention give a high surface gloss in injection molded and extruded articles, which is highly desirable from a commercial viewpoint.

Graft copolymers have been prepared by polymerizing mixtures of styrene and acrylonitrile monomers in synthetic rubber lattices, resulting in grafting of a portion of the styrene-acrylonitrile copolymer resin thus formed on the so-called synthetic rubber spine.

The present invention is an improvement over such present graft polymer practice. It has now been found that if the synthetic rubber latex of the spine is a large particle size latex of average particle diameter of 2,000 to 5,000 angstrom units, preferably 2,500 to 3,500 angstrom units, and the rubber is a copolymer of about 90 parts of butadiene-1,3 (hereinafter called "butadiene") and about 10 parts of styrene (viz 89–91 parts of butadiene and correspondingly 11–9 parts of styrene) and is a high gel rubber of at least 80 percent gel content, and if the ratio of the styrene and acrylonitrile mixture to synthetic rubber is 40 to 55 parts of said mixture to a corresponding 60 to 45 parts of synthetic rubber, and if the amount of anionic surface-active emulsifier in the synthetic rubber latex to which the styrene and acrylonitrile are added is maintained at not more than five parts per 100 parts of the sum of the synthetic rubber and the growing styrene-acrylonitrile copolymer that has been polymerized in the synthetic rubber latex until at least 75 percent of the styrene and acrylonitrile monomer mixture to be polymerized in admixture with the synthetic rubber has been converted to polymer, there will result a graft copolymer that has the desirable high gloss in injection molded and extruded articles made from it and made from mixtures of such graft copolymer with separately prepared styrene-acrylonitrile copolymer resins or alpha-methylstyrene-acrylonitrile copolymer resins, or resinous copolymers of acrylonitrile and mixtures of styrene and alpha-methyl-styrene.

The synthetic rubber latex of average particle diameter of 2,000 to 5,000 angstrom units ("average particle diameter" as used herein refers to average particle diameter as conventionally estimated by turbidity measurements) is prepared by polymerizing about 90 parts of butadiene and about 10 parts of styrene (89–91 parts of butadiene and correspondingly 11–9 parts of styrene) in 50 to 100 parts of water at temperatures of 100° to 170° F. to at least 90 percent conversion in the presence of 0.15 to 0.5 part of conventional mercaptan modifier, e.g. about 0.3 part of dodecyl mercaptan, 0.15 to 1.0 part of conventional catalyst, e.g. about 0.3 part of potassium persulfate, and certain critical levels of emulsifier which is an alkali metal (sodium or potassium) soap of a soap-forming monocarboxylic acid, such as a higher fatty acid having 12 to 20 carbon atoms in the molecule, e.g. oleic and stearic acids, or a rosin acid including disproportionated rosin acid, or a mixture of such soaps. The soap levels to give the latex of large particle size synthetic rubber latex particles which act as the spine for grafting the styrene-acrylonitrile resin to produce a graft copolymer having the desired high-gloss properties are an initial 0.1 to 0.3 part of alkali metal soap per 100 parts of butadiene and styrene until 20 to 50 percent conversion of the butadiene and styrene to copolymer, with the addition during further polymerization of 1.5 to 2.3 parts of alkali metal soap per 100 parts of original butadiene and styrene monomers to a final conversion of at least 90 percent of the monomers, after which if desired for further stabilization the soap level may be raised to three parts per 100 parts of butadiene and styrene copolymer and the latex may be stripped of residual unreacted butadiene. The high conversion of the butadiene and styrene in the presence of conventional amount of mercaptan modifier assures high gel content of the butadiene-styrene copolymer without the addition of a third monomeric cross-linking agent, such as divinylbenzene.

In grafting the styrene and acrylonitrile on the butadiene-styrene copolymer, 40 to 55 parts of a mixture of styrene and acrylonitrile are polymerized in the range of 120° to 175° F. in the above butadiene-styrene copolymer synthetic rubber latex containing a corresponding 60 to 45 parts of synthetic rubber (i.e. 100 parts total) to a conversion of at least 85 percent of the styrene and acrylonitrile to copolymer while maintaining the emulsifier content of the synthetic rubber latex at not more than five parts of emulsifier per 100 parts of synthetic rubber and styrene-acrylonitrile copolymer that has been polymerized in the synthetic rubber latex until at least 75 percent of the styrene and acrylonitrile mixture to be polymerized in admixture with the synthetic rubber has been converted to polymer. In polymerizing the styrene and acrylonitrile in the synthetic rubber latex to make the graft copolymer, or in separately emulsion polymerizing the acrylonitrile and styrene and/or alpha-methylstyrene to prepare a polymer to be admixed with the graft copolymer, the emulsifying agent may be one or a mixture of conventional anionic surface-active emulsifying agents, such as alkali-metal soaps of soap-forming monocarboxylic acids as above referred, or sulfonated or sulfated surface-active emulsifying agents having the general formula R—SO₃M or R—OSO₃M, where M represents alkali-metal and R represents an organic radical having nine to 23 carbon atoms, such as alkyl sulfonates, e.g., dodecyl sodium sulfonate; alkyl sulfates, e.g. sodium oleyl sulfate; alkyl aryl sulfonates, e.g. dodecyl benzene sulfonate; aryl sulfonate-formaldehyde condensation products, e.g. condensation product of sodium naphthalene sulfonate and formaldehyde. The ratio of styrene to acrylonitrile in the mixture that is added to the synthetic rubber latex is 60 to 80 parts of styrene to a corresponding 40 to 20 parts of acrylonitrile (i.e. 100 parts total). About 0.1 to 1.0 part of conventional catalyst per 100 parts of styrene and acrylonitrile mixture (e.g. about 0.4 part of potassium persulfate) is also added as initiator for the styrene and acrylonitrile polymerization which is a rapid polymerization.

The following examples illustrate the invention. All parts and percentages referred to herein are by weight.

EXAMPLE 1

The synthetic rubber latex was made as follows: 90 parts of butadiene and 10 parts of styrene in 57 parts of water containing 0.16 part of potassium soap of disproportionated rosin acid ("Dresinate 731"), 0.1 part of sodium hydroxide, 0.3 part of potassium persulfate and 0.3 part of dodecyl mercaptan were polymerized in a closed reactor, from which air had been removed, at 130° F. until about 21 percent conversion (of butadiene and styrene to copolymer), at which time 0.29 part of Dresinate 731 and 0.0043 part of sodium hydroxide in 1.83 parts of water were added. This was followed by five further additions each of 0.29 part of Dresinate 731 and 0.0043 part of sodium hydroxide in 1.83 parts of water at about 31, 46, 56, 68 and 81 percent conversions, and the polymerization was continued to about 95 percent conversion. The temperature was increased to 140°, to 150° and to 155° F. at conversions of about 31, 46, and 68, percent, respectively. After 95 percent conversion, 0.75 part of potassium oleate and four parts of water were added as a post stabilizer and residual butadiene was removed by venting and steam distillation. The average particle diameter of lattices made in this manner on low initial soap with further additions of only a small amount of soap to a high final conversion assures an average particle diameter of 2,000 to 5,000 angstrom units. The average particle diameter of such latex, based on turbidimetric measurements of sixteen batches, was 2,800 to 3,200 angstrom units. The rubber had a high gel content of over 80 percent gel. Small and medium particle size synthetic rubber lattices of up to 1,200 angstrom units average particle diameter, as made with larger amounts of soap, when used as the spine of the graft copolymers, do not give graft polymers that impart the high surface gloss to injection molded and extruded articles made therefrom that is imparted to articles made from graft copolymers produced from the large particle size synthetic rubber lattices of the present invention. Also, it is noted that agglomerating such small and medium particle size synthetic lattices to so-called large particle size latices, as by the known addition of limited amounts of destabilizing salts to the latex, and using them for the spine in preparing graft copolymer lattices do not impart the high surface gloss to injection molded and extruded articles as in the present invention.

The graft copolymer was made as follows: An amount of the above latex containing 50 parts of the butadiene-styrene copolymer of about 90 parts of combined butadiene and about 10 parts of combined styrene was introduced into the reactor from which air had been evacuated. About 0.4 part of potassium persulfate dissolved in 10.7 parts of water was added and further water was added to a total of 110 parts in the reactor. The batch was heated to about 150° F. There was charged to the reactor at a uniform feed rate a total of 50 parts of a mixture of 34 parts of styrene and 16 parts of acrylonitrile. At the same time, there was also gradually charged to the reactor an aqueous solution containing a total of two parts of "Dresinate 731" and 0.06 part of sodium hydroxide in 30 parts of water. The reaction was exothermic and the temperature was maintained at about 150° F. by jacket cooling of the reactor with refrigerated water. At the end of the feed period, the conversion of styrene and acrylonitrile to copolymer was about 85 percent. The temperature of the batch was raised to about 155° F. and polymerization was continued to about 95 percent conversion. Where the graft polymer is to be recovered in solid form, the latex may be conventionally coagulated with acid or polyvalent-metal salt, and the coagulum dried. In a run as above, the latex was coagulated by the addition of acetic acid followed by filtering the coagulum and drying. About 3.5 parts of conventional antioxidants per 100 parts of the graft copolymer were added to the latex as an emulsion before coagulating. In order to test this material, it can be blended on a heated two-roll mill with 1.0 part of a suitable lubricant, granulated and injection molded into physical test specimens.

An important feature of graft polymer of the present invention is its use as a single basic graft polymer for mixing with any desired amount of separately prepared resinous copolymer of acrylonitrile and styrene or alpha-methylstyrene or mixtures of styrene and alpha-methylstyrene to give a wide range of physical properties of the mixed polymers for making many different products, thus eliminating the necessity, as in many prior practices, of making a different graft polymer for each rubber-resin product having a different ratio of rubber to total resin content. Such mixtures, according to the present invention, will range from 90 to 10 parts of the graft copolymer to a corresponding 10 to 90 parts of the copolymer resin (i.e. 100 parts total). The composition of the copolymer resins will be 60 to 80 parts of combined styrene or alpha-methylstyrene or both and a corresponding 40 to 20 parts of combined acrylonitrile (i.e. to make 100 parts total). Such copolymer resins are well known and may readily be made by emulsion polymerization, or by other known polymerization methods such as bulk, solution or suspension polymerization. Where the copolymer resin is in solid form as from such bulk, solution or suspension polymerization, or by coagulation of an emulsion polymerizate, the copolymer resin may be intimately mixed with the solid graft copolymer on a mill or in a Banbury or in an extruder. Where the lattices of the graft copolymer and the separately prepared copolymer resin are available, it is preferred to mix the latex of the graft copolymer with the latex of the copolymer resin, add an emulsion of a conventional antioxidant, and cocoagulate the graft and resin copolymers. The graft copolymer of the present invention imparts a high surface gloss to injection molded and extruded articles made from such mixtures. It is understood that such graft copolymers and mixtures with such copolymer resins may be compounded with conventional antioxidants, lubricants, plasticizers, pigments.

EXAMPLE 2

It is well known to prepare copolymer resin lattices by polymerizing mixtures of 20 to 40 parts of acrylonitrile and correspondingly 80 to 60 parts of styrene or alpha-methylstyrene or mixtures of styrene and alpha-methylstyrene in 80 to 300 parts of water containing two to five parts of anionic surface-active emulsifier, such as alkali-metal soap of higher fatty acid or rosin acid, or sulfated or sulfonated surface-active emulsifying agent as above described, 0.03 to 1.0 part of catalyst, such as potassium persulfate, and zero to 0.5 part of conventional modifier, such as dodecyl mercaptan or mixed tertiary $C_{12}$ to $C_{16}$ alkyl mercaptans, to give resins of the desired intrinsic viscosities. The temperature range of such polymerizations is generally 120° to 175° F.

Three such resins were prepared as follows:

Resin A latex was prepared by polymerizing 72 parts of styrene and 28 parts of acrylonitrile in 120 parts of water containing two parts of emulsifier (Dresinate 731), 0.11 part of modifier (mixed tertiary $C_{12}$ to $C_{16}$ alkyl mercaptans) and 0.3 part of catalyst (potassium persulfate) at about 150° F. to over 95 percent conversion of styrene and acrylonitrile to copolymer resin. The intrinsic viscosity of the resin was 0.90–1.1.

Resin B latex was prepared by polymerizing 72 parts of styrene and 28 parts of acrylonitrile in 120 parts of water containing 2.0 parts of emulsifier (Dresinate 731), 0.46 part of modifier (mixed tertiary $C_{12}$ to $C_{16}$ alkyl mercaptans), and 0.3 part of catalyst (potassium persulfate at about 150° F. to over 95 percent conversion of styrene and acrylonitrile to copolymer resin. The intrinsic viscosity of the resin was 0.53–0.58.

Resin C latex was prepared by polymerizing 69 parts of alpha-methylstyrene and 31 parts of acrylonitrile in 120 parts of water containing 4.8 parts of emulsifier (mixture of anionic sulfated and sulfonated surface-active emulsifying agents), 0.47 part of modifier (mixed tertiary $C_{12}$ to $C_{16}$ alkyl mercaptans), and 0.5 part of catalyst (potassium persulfate) at about 160° F. to over 95 percent conversion of alpha-methylstyrene and acrylonitrile to copolymer resin. The intrinsic viscosity of the resin was 0.55–0.60.

The following illustrates the preparation of mixtures of the graft copolymer of example 1 with resins A, B and C, in different ratios of such resins to graft copolymer to give mixtures having a wide range of physical properties while retaining the desired property of high surface gloss in injection molded and extruded articles made therefrom.

An aliquot of the graft copolymer latex of example 1 containing 10.5 parts of graft copolymer was mixed with an aliquot of resin A latex containing 89.5 parts of resin A. An emulsion containing 1.75 parts of conventional antioxidants was added to the mixture. The mixture was coagulated with acetic acid, and the coagulum was filtered and dried. The dried coagulum was blended with 3.0 parts of suitable lubricant on a heated two-roll mill, granulated and injection molded into physical test specimens. (Mixture I)

An aliquot of the graft copolymer latex of example 1 containing 32 parts of graft copolymer was mixed with an aliquot of resin C latex containing 68 parts of resin C. An emulsion containing 1.25 parts of conventional antioxidants was added to the mixture. The mixture was coagulated with calcium chloride, and the coagulum was filtered and dried. The dried coagulum was blended with 2.0 parts of a suitable lubricant on a heated two-roll mill, granulated and injection molded into physical test specimens. (Mixture II)

An aliquot of the graft copolymer latex of example 1 containing 41 parts of graft copolymer was mixed with an aliquot of resin A latex containing 59 parts of resin A. An emulsion containing 2.45 parts of conventional antioxidants was added to the mixture. The mixture was coagulated with acetic acid, and the coagulum was filtered and dried. The dried coagulum was blended with 3.0 parts of a suitable lubricant on a heated two-roll mill, granulated and injection molded into physical test specimens. (Mixture III)

An aliquot of the graft copolymer latex of example 1 containing 88 parts of graft copolymer was mixed with an aliquot of resin B latex containing 12 parts of resin B. An emulsion containing 2.3 parts of conventional antioxidants was added to the mixture. The mixture was coagulated with acetic acid, and the coagulum was filtered and dried. The dried coagulum was blended with 1.0 part of a suitable lubricant on a heated two-roll mill, granulated and injection molded into physical test specimens. (Mixture IV)

The differences in the physical properties of the above graft copolymer and mixtures, I, II, III and IV are illustrated in the following: Rockwell hardness (A.S.T.M. D–785) of mixtures I, II and III was M63, R112 and R101 respectively, whereas the graft copolymer was not sufficiently hard to test by A.S.T.M. D–785. notched Izod impact resistance measured at room temperature (A.S.T.M. D–256) for the graft copolymer, mixtures II, III and IV was 9.6, 2.5, 6.4 and 9.4 foot-pounds per inch of Izod notch respectively. The heat deflection temperature (A.S.T.M. D–648) of mixtures I, II and III was 202°, 230° and 199° F. respectively.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The process for making a graft copolymer which comprises polymerizing in a synthetic rubber latex of average particle diameter, based on turbidimetric measurements, of 2,000 to 5,000 angstrom units, the synthetic rubber being a copolymer of about 90 parts of butadiene and about 10 parts of styrene and having at least 80 percent gel content, a mixture of styrene and acrylonitrile in the ratio of 40 to 55 parts of said mixture to a corresponding 60 to 45 parts of synthetic rubber, the ratio of styrene to acrylonitrile in said mixture being 60 to 80 parts of styrene to a corresponding 40 to 20 parts of acrylonitrile, the polymerization of the styrene and acrylonitrile being carried out at 120° to 175° F. until conversion of at least 85 percent of the styrene and acrylonitrile to copolymer, and maintaining the amount of emulsifier in the synthetic rubber latex at not more than five parts of anionic surface-active emulsifying agent per 100 parts of synthetic rubber and styrene-acrylonitrile copolymer that has been polymerized in the synthetic rubber latex until at least 75 percent of the styrene and acrylonitrile monomer mixture to be polymerized in admixture with the synthetic rubber latex has been converted to polymer.

2. The process for making a graft copolymer as claimed in claim 1 in which the styrene and acrylonitrile mixture is added continuously to the synthetic rubber latex.

3. The process for making a graft copolymer as claimed in claim 2 in which the average particle diameter of the synthetic rubber latex is 2,500 to 3,500 angstrom units.

4. The process for making a graft copolymer as claimed in claim 1 in which the synthetic rubber latex is prepared by polymerizing about 90 parts of butadiene and about 10 parts of styrene in 50 to 100 parts of water at 110° to 170° F. initially in the presence of 0.1 to 0.3 part of alkali metal soap of soap-forming monocarboxylic acid until 20 to 50 percent conversion, and thereafter adding 1.5 to 2.3 parts of such alkali metal soap during further conversion to a final conversion of at least 90 percent.

5. The process which comprises intimately mixing the graft copolymer made by the process of claim 1 with a separately prepared copolymer resin of 60 to 80 parts of material selected from the group consisting of styrene and alpha-methylstyrene and correspondingly 40 to 20 parts of acrylonitrile, the ratio of graft copolymer to said separately prepared copolymer resin being from 90 to 10 parts of the graft copolymer to a corresponding 10 to 90 parts of the separately prepared copolymer resin.

6. The process which comprises intimately mixing the graft copolymer made by the process of claim 1 with a separately prepared copolymer resin of 60 to 80 parts of material selected from the group consisting of styrene and alpha-methylstyrene and correspondingly 40 to 20 parts of acrylonitrile, the ratio of graft copolymer to said separately prepared copolymer resin being from 90 to 10 parts of the graft copolymer to a corresponding 10 to 90 parts of the separately prepared copolymer resin.

7. The process of claim 6 in which the mixture of graft copolymer and separately prepared copolymer resin is made by blending the latex of the graft copolymer with the latex of the separately prepared copolymer resin, coagulating and drying the coagulum.

* * * * *

UNITED STATES PATENT OFFICE
CERTIFICATE OF CORRECTION

Patent No. 3,624,183          Dated November 30, 1971

Inventor(s) Benton R. Leach et al.

It is certified that error appears in the above-identified patent and that said Letters Patent are hereby corrected as shown below:

On the cover sheet [73], "United States Rubber Company" should read -- Uniroyal, Inc., --.

Signed and sealed this 12th day of September 1972.

(SEAL)
Attest:

EDWARD M. FLETCHER, JR.          ROBERT GOTTSCHALK
Attesting Officer                 Commissioner of Patents